US010610013B2

(12) United States Patent
Chen et al.

(10) Patent No.: US 10,610,013 B2
(45) Date of Patent: Apr. 7, 2020

(54) MODULAR CABINET DESIGN

(71) Applicant: QUANTA COMPUTER INC., Taoyuan (TW)

(72) Inventors: Chao-Jung Chen, Taoyuan (TW); Wen-Lung Liao, Taoyuan (TW); Chih-Ming Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/855,810

(22) Filed: Dec. 27, 2017

(65) Prior Publication Data
US 2019/0191871 A1 Jun. 27, 2019

(51) Int. Cl.
*A47B 47/02* (2006.01)
*H02B 1/01* (2006.01)
(Continued)

(52) U.S. Cl.
CPC .......... *A47B 47/02* (2013.01); *A47B 47/0058* (2013.01); *F16B 12/08* (2013.01);
(Continued)

(58) Field of Classification Search
CPC . A47B 47/02; A47B 47/0058; A47B 47/0008; A47B 47/0016; A47B 47/0033; A47B 47/005; A47B 47/0041; F16B 12/08; F16B 12/30; F16B 7/0453; F16B 7/185; F16B 12/14; F16B 12/20; F16B 2012/145;
(Continued)

(56) References Cited

U.S. PATENT DOCUMENTS 3,229,335 A * 1/1966 Thome ............... A47B 47/0033
4,036,371 A * 7/1977 Michel ................ A47B 47/021
211/182
(Continued)

FOREIGN PATENT DOCUMENTS

CN 107708829 A 2/2018
EP 0183395 A1 6/1986
(Continued)

OTHER PUBLICATIONS

TW Search Report for Application No. 107110785, dated Jan. 16, 2019, w/ First Office Action.
(Continued)

*Primary Examiner* — Hiwot E Tefera
(74) *Attorney, Agent, or Firm* — Nixon Peabody LLP; Zhou Lu

(57) ABSTRACT

A cabinet structure is provided. The cabinet structure includes two side frames, and at least one vertical sectional bar connecting the side frames via at least two frame elements. The frame elements include first and second frame elements. The first frame element includes a connecting face that has a frontal cavity and a plurality of guide elements. The second frame element includes a receiving face configured to receive the guide elements of the first frame element, and a through hole aligned with the frontal cavity of the first frame. The frame elements also include a securing element configured to be screwed into the frontal cavity via the through hole to forge a secure interlocking fitting of the first and second frame elements.

15 Claims, 6 Drawing Sheets

(51) Int. Cl.
*F16B 12/08* (2006.01)
*F16B 12/30* (2006.01)
*A47B 47/00* (2006.01)

(52) U.S. Cl.
CPC .............. *F16B 12/30* (2013.01); *H02B 1/014* (2013.01); *Y10T 403/4602* (2015.01)

(58) Field of Classification Search
CPC .... F16B 2200/403; F16B 12/10; F16B 12/40; F16B 12/44; F16B 2012/446; F16B 2012/106; F16B 12/02; F16B 12/50; Y10T 403/4681; Y10T 403/4685; Y10T 403/4694; Y10T 403/7001; Y10T 403/7075; Y10T 403/1616; Y10T 403/4602; Y10T 403/44; Y10T 403/341; H02B 1/014; H02B 1/013; H02B 1/01; H05K 7/183
USPC ....... 403/231, 219, 292, 258, 260, 263, 346, 403/376, 217; 312/265.1, 257.1, 111, 312/265.4, 140; 211/26, 189, 182, 183
See application file for complete search history.

(56) References Cited

U.S. PATENT DOCUMENTS

| | | | | |
|---|---|---|---|---|
| 4,998,636 A * | 3/1991 | Hardigg | ................ | B65D 81/07 220/4.34 |
| 5,695,263 A * | 12/1997 | Simon | .................... | H05K 7/183 |
| 5,820,289 A * | 10/1998 | Kern | ........................ | H02B 1/01 403/231 |
| 5,875,600 A * | 3/1999 | Redman | ................ | E06B 3/9642 |
| 6,155,741 A * | 12/2000 | Took | ........................ | E06C 7/086 |
| 6,270,283 B1 * | 8/2001 | Turati | ........................ | H02B 1/01 403/174 |
| 6,299,268 B1 * | 10/2001 | Carle | ........................ | H02B 1/01 |
| 6,503,020 B1 * | 1/2003 | Mascioletti | ........... | E04B 1/2604 403/231 |
| 8,038,233 B2 * | 10/2011 | Pezzoni | .................... | A47F 3/12 |
| 8,091,970 B2 * | 1/2012 | Francisquini | ........... | H02B 1/301 312/265.1 |
| 2009/0178821 A1 * | 7/2009 | Zavidniak | ............ | H05K 7/183 174/51 |
| 2011/0309046 A1 * | 12/2011 | Lee | ........................ | A47B 47/03 |

FOREIGN PATENT DOCUMENTS

| | | |
|---|---|---|
| EP | 0948916 A1 | 10/1999 |
| EP | 1050244 A2 | 11/2000 |
| FR | 2674581 A1 | 10/1992 |
| JP | 3177219 U | 7/2012 |
| TW | M487598 U | 10/2014 |
| WO | 2008124911 A1 | 10/2008 |

OTHER PUBLICATIONS

Extended European Search Report for EP Application No. 18169244.3, dated Nov. 8, 2018.

JP Office Action for Application No. 2018-114942, dated Jul. 16, 2019, w/First Office Action Summary.

* cited by examiner

MODULAR CABINET DESIGN

FIELD OF THE INVENTION

The present invention relates generally to the field of cabinet and rack assembly design, specifically to modular structural elements used to fabricate cabinets and enclosures.

BACKGROUND

Cabinets and enclosures are used to house and protect a wide variety of items, which may vary greatly in size and shape. A variety of cabinet configurations have been developed for the protection of items such as electrical and electronic assemblies, vacuum tubes and state-of-the-art compact high speed hybrid and digital circuits. Today, electronic assemblies differ as to the space and proportions necessary to house them. There are many cabinet and enclosure structures available in many sizes. A cabinet that measures several cubic feet may be necessary to house a high voltage system or a multi-server system, while a cabinet that measures the size of a pack of cigarettes may be sufficient to house a compact electrical or embedded electronics arrangement. However, users of such enclosures are limited to either choosing a standard size enclosure, which may be too large for their applications; or fabricating a custom size enclosure, which may require welding, a large amount of machining, and/or high tooling and other significant costs.

In many situations, it is beneficial to use a cabinet with multiple compartments. For example, in the case of an electrical circuit or circuits, it may be desirable to separate a high voltage section from a low voltage section, or a particularly noise-sensitive circuit from other circuits. In such cases, custom fabrication becomes considerably more difficult and costly. Means for construction of a cabinet or enclosure, or a set of modular interconnected cabinets or enclosures, that provide strength, ease of assembly, and appropriate size for a particular application, large or small, have yet to be realized.

A number of attempts have been made to provide a cabinet which satisfies these criteria, but typically the cost or the complexity, the size, versatility or strength have been less than desirable. By way of example, the following U.S. Patents disclose either welded or modular frame assemblies representative of cabinet structures developed in the prior art.

U.S. Pat. No. 2,167,525 to Rosendale (hereinafter Rosendale) and U.S. Pat. No. 3,265,419 to Durnbaugh, et al. (hereinafter Durnbaugh) both disclose welded cabinet structures. Rosendale employs gussets—triangular pieces of metal—welded in each corner to hold three mutually perpendicular struts in a corner arrangement. Durnbaugh eliminates such gusset members and welds the strut members directly to each other at their intersection. However, the three strut members which form each corner have different cross-sectional configurations and end profiles. Thus, the manufacture and construction of the frame is complicated. Additionally, four welds are desired to join the struts to create a rigid frame structure. The cabinet structures of Rosendale and Durnbaugh therefore, are very labor intensive.

U.S. Pat. No. 3,182,846 to La Kaff (hereinafter La Kaff) and U.S. Pat. No. 3,919,603 to Salvati (hereinafter Salvati) disclose cabinet configurations that involve mechanical assembly. In La Kaff, side frame struts are coupled to the top and base members using engaging elements formed of generally rectangular aluminum blocks, which are attached by welding to the top and bottom members and struts. The engaging elements have frustoconical portions configured to fit snugly together. The top and base members are matted via the engaging elements and bolted together. Both manufacturing cost and lack of versatility make this frame an undesirable alternative. Salvati discloses a switchgear framework including a corner tie for supporting three structural corner members together. The corner tie has three rectangular-shaped perpendicular legs with three sides and outwardly facing flanges, the three struts being slid over the leg portions. However, the struts and leg portions have different cross-sectional configurations, and the corner tie is of a generally complex configuration, such that this frame structure is not conducive to low-cost manufacturing techniques.

Finally, U.S. Pat. No. 5,066,161 to Pinney (hereinafter Pinney) discloses a simplified cabinet frame structure element. However, the simplified cabinet frame structure element of Pinney requires bends, cuts at angles on corners, and a welding process. Thus, the simplified cabinet frame structure element of Pinney is not conducive to low-cost manufacturing techniques.

In view of the foregoing, what is needed is an enclosure and cabinet system that allows for rapid, low-cost, custom fabrication of high-strength, modular enclosures. For example, an enclosure and cabinet system that require little or no welding, and little or no machining is ideal.

SUMMARY

Embodiments of the invention concern a cabinet structure. The cabinet structure includes two side frames, and at least one vertical sectional bar connecting the side frames via two frame elements. The frame elements include first and second frame elements. The first frame element includes a connecting face that has a frontal cavity and a plurality of guide elements. The second frame element includes a receiving face configured to receive the guide elements of the first frame element, and a through hole aligned with the frontal cavity of the first frame. The frame elements also include a securing element configured to be screwed into the frontal cavity via the through hole to forge a secure interlocking fitting of the first and second frame elements.

In some embodiments, the plurality of guide elements includes two block-like, parallelepiped guide elements and the receiving face comprises slots to receive the two block-like, parallelepiped guide elements. In alternative embodiments, one of the plurality of guide elements includes four block-like, parallelepiped guide elements. The receiving face can include slots to receive the four block-like, parallelepiped guide elements. In some embodiments, the plurality of guide elements can include two semi-circle guide elements guide elements. The receiving face can include slots to receive the two semi-circle guide elements. In some embodiments, the securing element includes an assembly screw with a self-tapping thread engaging in the through hole of the second frame element. In some embodiments, the first frame element can be secured within one of the at least two vertical sectional bars via additional fixing elements. Similarly, the second frame element can be secured within one of the at least two side frames via additional fixing elements. Alternatively, the first frame element can be secured within one of the at least two vertical sectional bars via spot welding. In some embodiments, the second frame element can be secured within one of the at least two side frames via spot welding.

DETAILED DESCRIPTION

Figure 1:
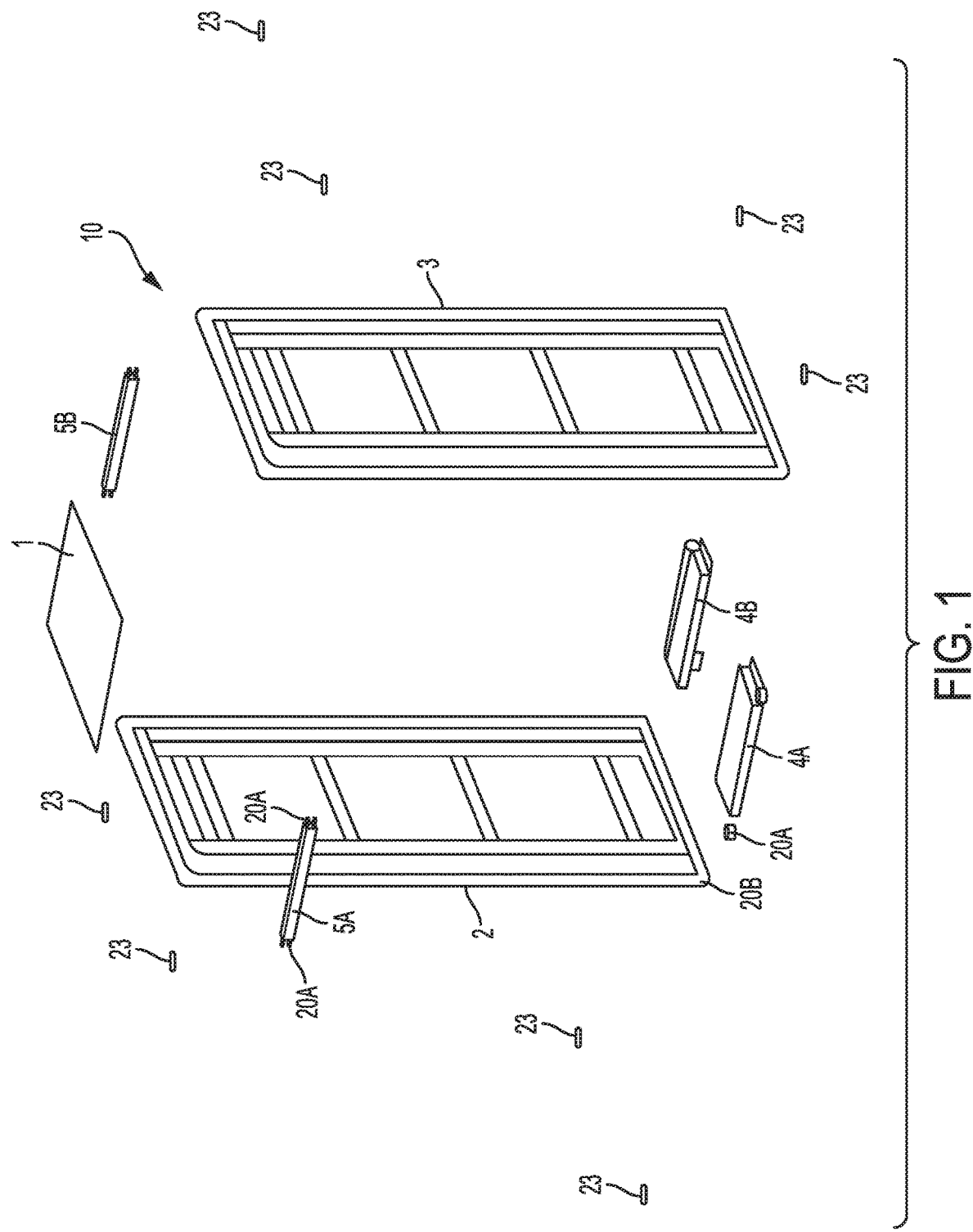
FIG. 1 is an exploded view of a cabinet, in accordance with embodiments of the disclosure.

The present invention is described with reference to the attached figures, wherein like reference numerals are used throughout the figures to designate similar or equivalent elements. The figures are not drawn to scale, and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognizes that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention provide interlocking frame elements used to join frames of an enclosure and cabinet system. The interlocking frame elements are not only able to join frames, but can also support the weight, stress and shear that cabinets encounter. Furthermore, the interlocking frame can vary in cross-sectional shapes to allow for rapid, low-cost, custom fabrication of high-strength, modular enclosures that require little or no welding, and little or no machining. In this disclosure, all of the components can be pre-fabricated separately to reduce costs associated with transportation and storage. Because cabinet systems are typically welded, construction is typically required before transportation and storage. Therefore, consumers typically receive large shipments of the full sized cabinet structure completely assembled. In this disclosure, the entire enclosure and cabinet system can be assembled on site. The claimed frame element can be installed between the left and the right frame with an interlocking mechanism. The interlocking mechanism can be secured utilizing a threaded bolt or a screw. Thus, the interlocking frame elements allow for shipping and storing flat packs for the enclosure and cabinet system. Thus, the costs associated with transportation and storage can be further reduced.

FIG. 1 is an exploded view of an exemplary cabinet 10 for subassemblies and equipment. The cabinet 10 can include a top cover 1, a left frame 2, a right frame 3, base frames 4A and 4B, vertical sectional bars 5A and 5B connecting the left frame 2 and right frame 3. The vertical sectional bars 5A and 5B are interconnected by means of the frame elements 20A and 20B to the left frame 2 and the right frame 3. The frame elements 20A and 20B and the integration into cabinet 10 are discussed in greater detail below. The cabinet 10 can be formed from metal, plastic, composite, or a combination thereof and can be configured to support the weight of any electrical and electronic assemblies disposed therein. In certain embodiments, the cabinet 10 and its components can be made of sheet metal using conventional metal fabrication techniques such as bending, forming, and stamping. As a result, the cabinet 10 can, in some embodiments, be made very inexpensively. Alternatively, the cabinet 10 and its components can be made of aluminum alloy, steel alloy, or any combination thereof. It should be realized that the cabinet 10 and its components can be made of any material with low cost of construction and durability to house electrical and electronic assemblies of varying weight. The materials mentioned above are only for example, and not to limit this disclosure. Thus, the present disclosure contemplates that any material or combination of materials can be used in the various embodiments without limitation.

Figure 2:
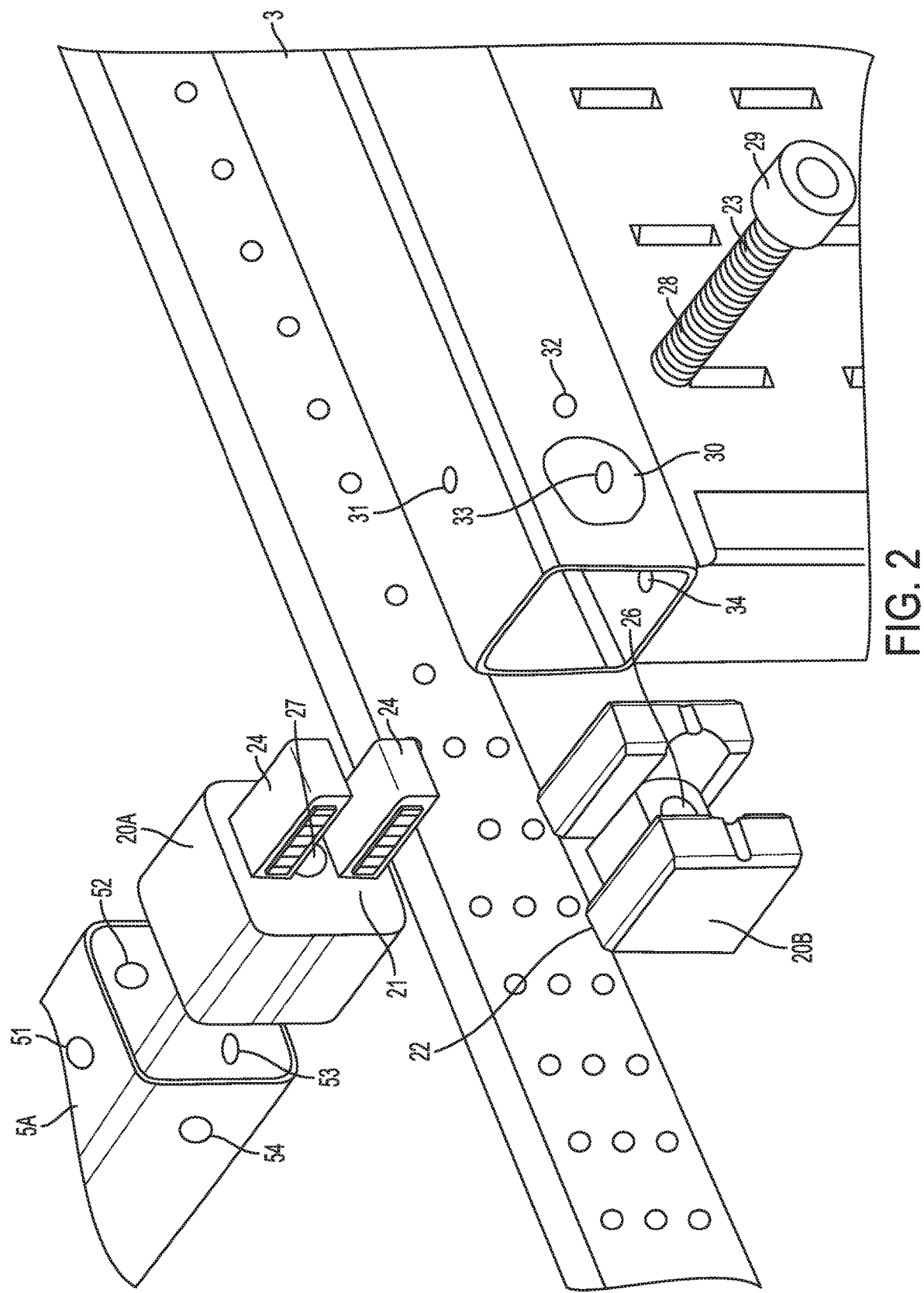
FIG. 2 is a close-up of the exploded view of the frame elements, in accordance with embodiments of the disclosure.

Now turning to FIG. 2, there is shown a close-up of an exploded view of an exemplary set of frame elements 20A and 20B in accordance with some embodiments. In certain embodiments, the frame elements 20A and 20B can be formed from a hollow aluminum pressure die casting. The present disclosure contemplates that any material or combination of materials can be used in the various embodiments without limitation. It should be realized that the frame elements 20A and 20B can be made utilizing any process that allows for low construction cost. The process of hollow aluminum pressure die casting mentioned above is only for example, and not to limit this disclosure. Frame element 20A can include a male connecting face 21 with two block-like, parallelepiped guide elements 24 extending therefrom. The connecting face 21 can include a frontal cavity 27 extending through frame element 20A. Frame element 20B can include a female connecting face 22 that includes two slots for receiving the parallelepiped guide elements 24 of frame element 20A. In some embodiments, the fit between the male frame element and the female frame element can be exact to provide a more solid support piece once combined. In other embodiments, the fit between the male frame element and the female frame element can be loose to facilitate assembly on site. Furthermore, designing the male frame element and the female frame element to have a loose assembly, or less tolerance, can reduce the cost of production. A loose assembly may include, for example, tapered guide elements. In this configuration, the design tolerance can be lower while the strength and stability of the frame elements can be maintained. This exemplary design is discussed in further detail below.

Figure 4:
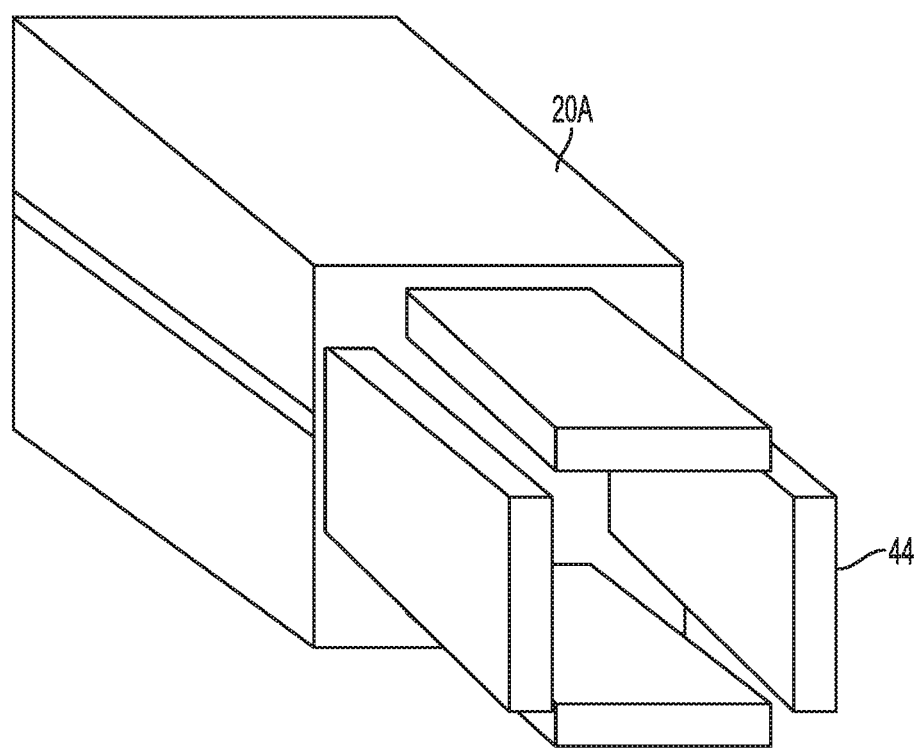
FIG. 4 illustrates an alternative frame element with four block-like, parallelepiped guide elements, in accordance with embodiments of the disclosure.
Figure 5:
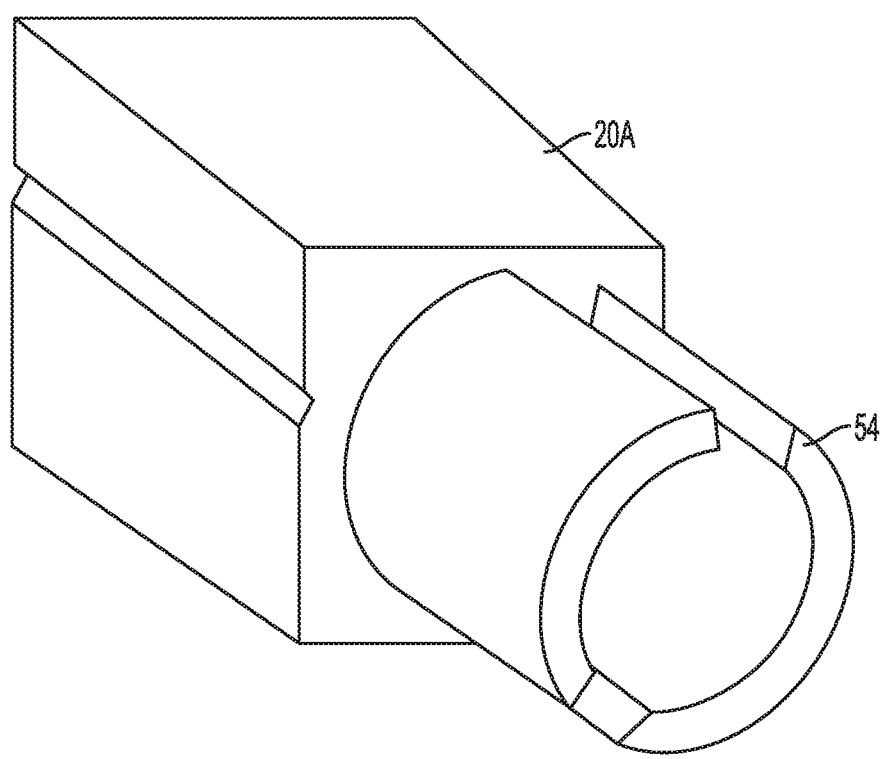
FIG. 5 illustrates an alternative frame element with two semi-circle guide elements, in accordance with embodiments of the disclosure.
Figure 6:
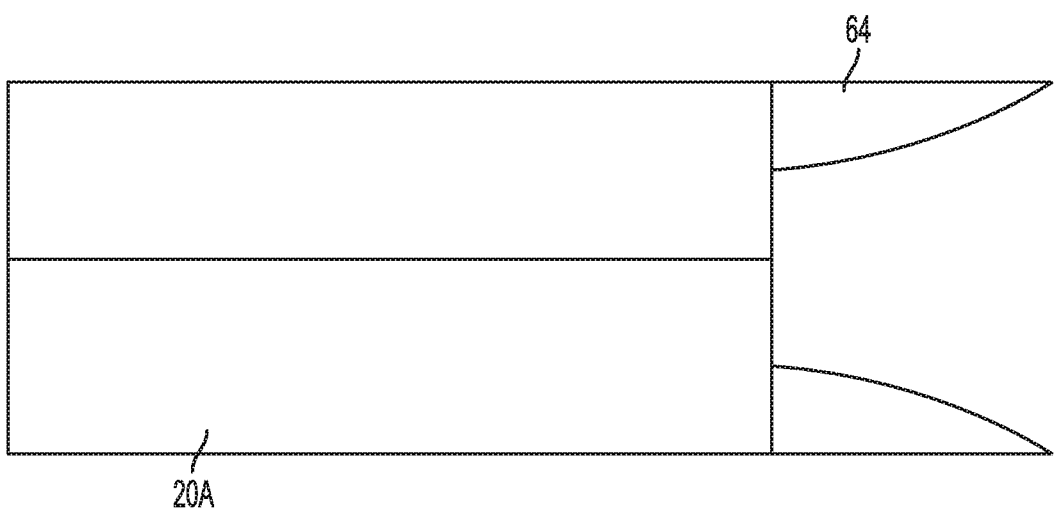
FIG. 6 illustrates an alternative frame element with two tapered guide elements, in accordance with embodiments of the disclosure.

Although FIG. 2 shows only two guide elements, in some embodiments, the frame element 20A can include a varying number of block-like, parallelepiped guide elements. For example, in FIG. 4 the frame element 40A is shown with four block-like, parallelepiped guide elements 44. Likewise, the frame element 40B can include four slots for receiving the parallelepiped guide elements 44 of frame element 40A. FIG. 5 shows the frame element 50A with two semi-circle guide elements 54. Likewise, the frame element 50B can include two slots for receiving the semi-circle guide elements 54 of frame element 50A. Further, the guide elements can be rounded, or tapered at the end to allow for more density of the frame element 50B. In some embodiments, the guide elements can be rounded, or tapered at the end to allow for more density of the frame element 50B. FIG. 6 shows the frame element 60A with two tapered guide elements 64. As illustrated by way of example, various guide elements can be implemented to interlock a male frame element with a female frame element. Regardless of the orientation, a female frame element would be configured to correspond to the configuration of a corresponding male frame element. In some embodiments, the frame elements may have embody the configuration of both have male and female components. For example, each frame element may be configured such to have a guide element and a receiving element corresponding to the other's guide element.

Referring back to FIG. 2, the frame element 20B can also include a through hole 26 for receiving a fixing element 23. In this embodiment the fixing element 23 can include an assembly screw 29 with a thread 28 on the front shank engaging in the through hole 26. The fixing element 23 can be screwed into the frontal cavity 27 of the connecting face 21 of the frame element 20A. In some embodiments, the through holes 26 are provided at their exit openings with spot facings, which can be used for collecting the turnings or material thrown up during screwing in.

The frame element 20A can be fixed within the vertical sectional bar 5A via additional fixing elements, for example, the vertical sectional bar 5A can include through holes 51, 52, 53 and 54. The additional fixing elements can secure the frame element 20A within the vertical sectional bar 5A via the through holes 51, 52, 53 and 54. Conversely, the frame element 20A can be fixed within the vertical sectional bar 5A by implementing a spot welding process. That is, the through holes 51, 52, 53 and 54 can alternatively serve as welding points of a spot welding process to secure frame element 20A in place. It should be realized that the process of securing the frame element 20A within the vertical sectional bar 5A can be accomplished by any means preferably with low costs of construction while maintaining durability to house electrical and electronic assemblies of varying weight. The processes mentioned above are only for example, and not to limit this disclosure. A person having ordinary knowledge in the art may affix the frame element 20A within the vertical sectional bar 5A by implementing any process in accordance with the disclosure.

Similarly, the frame element 20B can also be fixed within the right frame 3 implementing additional fixing elements. The right frame 3 can include through holes 30, 31, 32, 33 and 34. It should be noted that the right frame 3 can include additional through holes not shown herein. Through hole 30 can be configured to receive the fixing element 23. The additional fixing elements can secure the frame element 20B within the right frame 3 via the through holes 31, 32, 33 and 34. Conversely, the frame element 20B can be fixed within the right frame 3 by implementing a spot welding process. That is, as discussed above with frame elements 20A, the through holes 31, 32, 33 and 34 can serve as welding points of a spot welding process. It should be realized that the process of securing the frame element 20B within the right frame 3 can be accomplished by any means preferably with low costs of construction while maintaining durability to house electrical and electronic assemblies of varying weight. The processes mentioned above are only for example, and not to limit this disclosure. A person having ordinary knowledge in the art may affix the frame element 20B within the right frame 3 by implementing any process in accordance with the disclosure.

Figure 3:
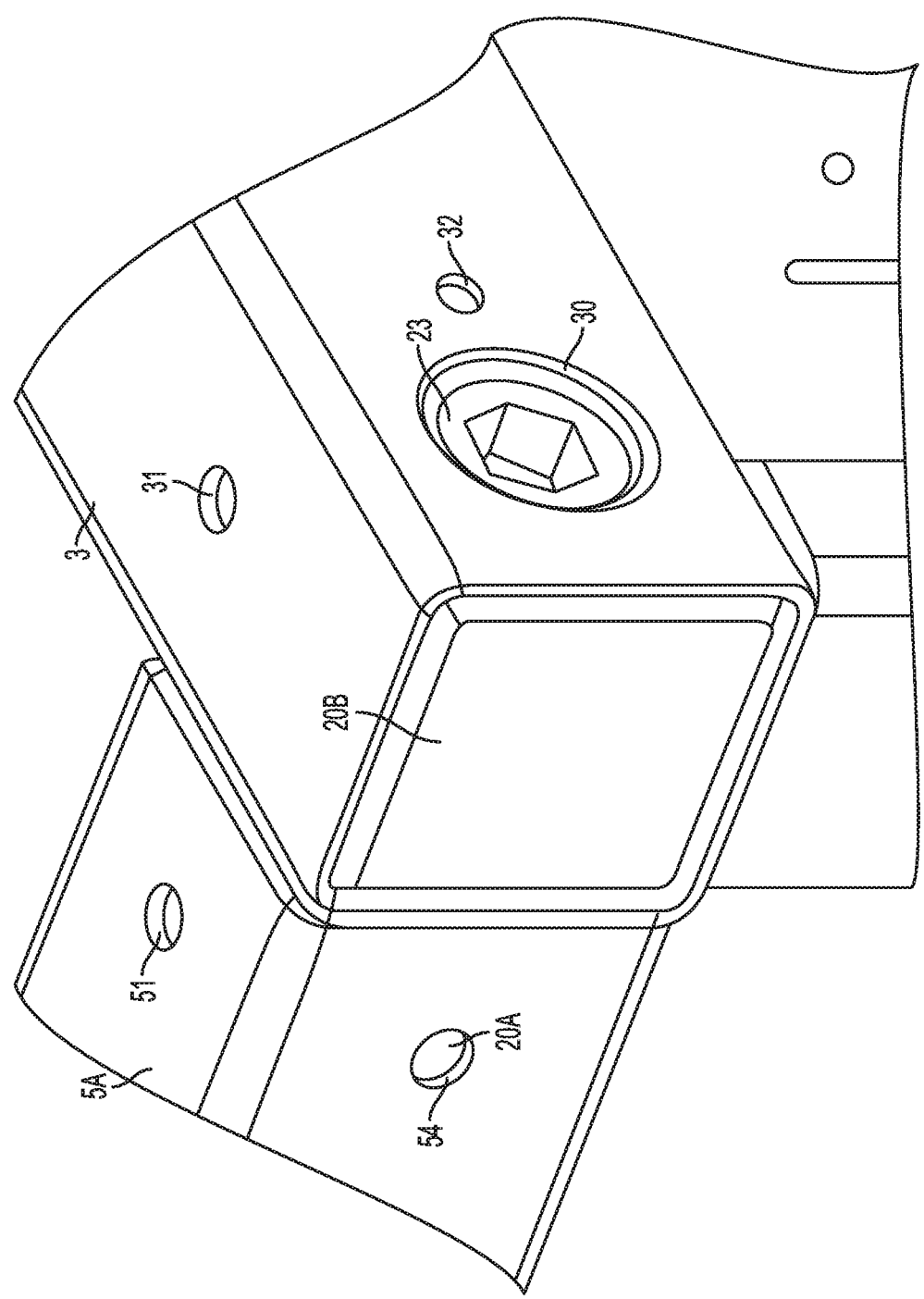
FIG. 3 is a close-up of the assembled view of the frame elements, in accordance with embodiments of the disclosure.

FIG. 3 is a close-up of the assembled view of the frame elements 20A and 20B. Once secured within the vertical sectional bar 5A and the right frame 3, the frame elements 20A and 20B can be secured together to forge a secure interlocking frontal fitting. The guide elements 24 of frame 20A interlock with the receiving slots of the frame element 20B to create a solid structure. During the frontal fitting of the frame elements 20A and 20B, the frontal cavity 27 of the connecting face 21 aligns with the through hole 26. Thus, the fixing element 23 can be screwed into the frontal cavity 27, of the connecting face 21, of the frame element 20A, via the through hole 26, thereby creating a secure interlocking frontal fitting of the frame elements 20A and 20B. The frame elements 20A and 20B can be secured together to create a secure interlocking frontal fitting to connect the vertical sectional bar 5A to the left frame 2. Similarly, the frame elements 20A and 20B can be secured together to create a secure interlocking frontal fitting to connect the base frames 4A and 4B to the left frame 2 and the right frame 3 to complete the construction of the cabinet 10.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A cabinet structure, comprising two side frames, a first hollow bar, and a securing element, the first hollow bar connecting the two side frames via a first frame element and a second frame element, wherein the first hollow bar includes a plurality of through holes, at least one of the plurality of through holes being formed on a first side of the first hollow bar, and at least one of the plurality of through holes being formed on a second side of the first hollow bar;

wherein the first frame element is fixed within the first hollow bar via the plurality of through holes of the first hollow bar, the first frame element comprising a connecting face having a frontal cavity, and a plurality of guide elements extending perpendicular from the connecting face;

wherein the second frame element is configured to be inserted into one of the side frames in a first direction and fully enclosed within the one of the side frames, the second frame element comprising a plurality of slots corresponding to the plurality of guide elements of the first frame element, and a through hole aligned with the frontal cavity of the first frame element;

wherein each of the plurality of slots of the second frame element is configured to receive a corresponding one of the guide elements of the first frame element from a second direction perpendicular to the first direction; and wherein the securing element is configured to be fit into the frontal cavity of the connecting face of the first frame element via the through hole of the second frame element creating a secure interlocking fitting of the first hollow bar and the one of the side frames.

2. The cabinet structure of claim 1, wherein
the plurality of guide elements comprises two block-shaped, parallelepiped guide elements, and
the plurality of slots receive the two block-shaped, parallelepiped guide elements.

3. The cabinet structure of claim 1, wherein
the plurality of guide elements comprises two semi-circle guide elements, and
the plurality of slots receive the two semi-circle guide elements.

4. The cabinet structure of claim 1, wherein the securing element comprises an assembly screw with a self-tapping thread engaging in the through hole of the second frame element.

5. The cabinet structure of claim 1, wherein the first frame element is secured within the first hollow bar via spot welding.

6. The cabinet structure of claim 1, wherein the second frame element is fixed within the one of the side frames via a second plurality of through holes.

7. A cabinet structure, comprising two side frames, and at least one horizontal sectional bar connecting the two side frames via a first frame element, a second frame element, and a securing element,
wherein the at least one horizontal sectional bar includes a plurality of through holes, at least one of the plurality of through holes being formed on a first side and at least one of the plurality of through holes being formed on a second side;

wherein the first frame element is fixed within the at least one horizontal sectional bar via the plurality of through holes of the at least one horizontal sectional bar, the first frame element comprising a base, the base having a frontal cavity and a plurality of guide elements extending from a first side of the base, and the base being configured to be inserted into the at least one horizontal sectional bar at a second side of the base opposite from the first side of the base;

wherein one of the side frames defines an aperture that is configured to receive the second frame element in a first direction, the second frame element comprising a plurality of slots corresponding to the plurality of guide elements of the first frame element, and a through hole aligned with the frontal cavity of the first frame element, wherein the second frame element is entirely received within the aperture;

wherein each of the plurality of slots of the second frame element is configured to receive a corresponding one of the guide elements of the first frame element from a second direction perpendicular to the first direction; and wherein the securing element is configured to be fit into the frontal cavity of the base of the first frame element via the through hole of the second frame element creating a secure interlocking fitting of the at least one horizontal sectional bar and the one of the side frames.

8. The cabinet structure of claim 7, wherein
the plurality of guide elements comprises two block-shaped, parallelepiped guide elements, and
the plurality of slots receive the two block-shaped, parallelepiped guide elements.

9. The cabinet structure of claim 7, wherein
the plurality of guide elements comprises two semi-circle guide elements guide elements, and
the plurality of slots receive the two semi-circle guide elements.

10. The cabinet structure of claim 7, wherein the securing element comprises an assembly screw with a self-tapping thread engaging in the through hole of the second frame element.

11. The cabinet structure of claim 7, wherein the first frame element is secured within the at least one horizontal sectional bar via additional fixing elements or spot welding.

12. The cabinet structure of claim 7, wherein the second frame element is secured within the one of the side frames via additional fixing elements or spot welding.

13. An apparatus, comprising two side frames, a first bar, and a securing element, the first bar connecting the two side frames via a first frame element and a second frame element,
wherein the first bar includes a plurality of through holes, at least one of the plurality of through holes being formed on a first side of the first bar and at least one of the plurality of through holes being formed on a second side of the first bar;

wherein the first frame element is fixed within the first bar via the plurality of through holes of the first bar, the first frame element comprising a connecting face having frontal cavity, and a plurality of guide elements extending perpendicularly from the connecting face;

wherein the second frame element is housed within one of the side frames, the second frame element comprising a plurality of slots corresponding to the plurality of guide elements of the first frame element, and a through hole aligned with the frontal cavity of the first frame element;

wherein the second frame element is configured to be fully inserted into the one of the side frames from a first direction;

wherein each of the plurality of slots of the second frame element is configured to receive a corresponding one of the guide elements of the first frame element from a second direction perpendicular to the first direction; and wherein the securing element is configured to be fit into the frontal cavity of the connecting face of the first frame element via the through hole of the second frame element creating a secure interlocking fitting of the first bar and the one of the side frames.

14. The apparatus of claim 13, wherein the first bar defines an aperture that is configured to receive the first frame element.

15. The apparatus of claim 13, wherein the entire frontal cavity of the first frame element is housed within the first bar.

* * * * *